(12) United States Patent
Park et al.

(10) Patent No.: US 7,397,467 B2
(45) Date of Patent: Jul. 8, 2008

(54) MOBILE COMMUNICATION TERMINAL WITH MULTI-INPUT DEVICE AND METHOD OF USING THE SAME

(75) Inventors: Tae-Won Park, Seoul (KR); Do-Hwan Choi, Daegu (KR); Yeong-Moo Ryu, Gyeongsangbuk-do (KR); Hark-Sang Kim, Daejeon (KR); Byung-Hwan Suh, Gyeongsangbuk-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 578 days.

(21) Appl. No.: 11/002,112

(22) Filed: Dec. 3, 2004

(65) Prior Publication Data

US 2005/0140657 A1 Jun. 30, 2005

(30) Foreign Application Priority Data

Dec. 12, 2003 (KR) ............... 10-2003-0090512

(51) Int. Cl.
*G06F 3/041* (2006.01)
(52) U.S. Cl. ............... 345/173; 345/169; 178/18.01
(58) Field of Classification Search ......... 345/156–158, 345/169, 173, 184; 455/90; 178/18.01–18.04, 178/19.01
See application file for complete search history.

(56) References Cited

U.S. PATENT DOCUMENTS

| 6,330,149 B1* | 12/2001 | Burrell ............ 361/683 |
| 6,546,231 B1* | 4/2003 | Someya et al. ....... 455/550.1 |
| 6,992,658 B2* | 1/2006 | Wu et al. ............ 345/169 |
| 7,111,788 B2* | 9/2006 | Reponen .......... 235/472.01 |
| 2002/0145587 A1* | 10/2002 | Watanabe ............ 345/156 |
| 2002/0196239 A1 | 12/2002 | Lee ............... 345/184 |
| 2003/0048262 A1* | 3/2003 | Wu et al. ............ 345/173 |
| 2003/0128192 A1* | 7/2003 | van Os ............. 345/173 |

FOREIGN PATENT DOCUMENTS

| EP | 1 333 363 | 8/2003 |
| EP | 1333363 A2 | 8/2003 |
| JP | 2001-296653 | 10/2001 |
| JP | 2001-296953 | 10/2001 |
| JP | 2001296953 | 10/2001 |
| JP | 2003-256120 | 9/2003 |
| KR | 1020000013181 | 3/2000 |
| KR | 20-0264587 | 2/2002 |
| KR | 1020050050803 | 6/2005 |
| WO | WO 01/28197 | 4/2001 |
| WO | 03/090008 | 10/2003 |
| WO | WO 03/090008 A2 | 10/2003 |

* cited by examiner

*Primary Examiner*—Richard Hjerpe
*Assistant Examiner*—Kimnhung Nguyen
(74) *Attorney, Agent, or Firm*—Roylance, Abrams, Berdo & Goodman L.L.P.

(57) ABSTRACT

A radiation module capable of resisting reverse flow of hot fluid includes a fan, a radiator and a retaining tool. The fan provides an inlet and an outlet. The radiator is connected to the outlet of the fan. The retaining tool secures the radiator to a heat generation part. At least a baffle is provided in the radiation module. The fluid enters the fan via the inlet and flows toward the radiator via the outlet to cool the heat-generating component and the hot fluid moving outward the radiator is resisted entering the inlet with the baffle part so as to enhance heat dissipation efficiency.

16 Claims, 7 Drawing Sheets

A-A' CROSS-SECTIONAL VIEW

A-A' CROSS-SECTIONAL VIEW

MOBILE COMMUNICATION TERMINAL WITH MULTI-INPUT DEVICE AND METHOD OF USING THE SAME

PRIORITY

This application claims the benefit under 35 U.S.C. 119(a) of an application entitled "MOBILE COMMUNICATION TERMINAL WITH MULTI-INPUT DEVICE", filed in the Korean Intellectual Property Office on Dec. 12, 2003 and assigned Serial No. 2003-90512, the entire contents of which are incorporated herein by reference.

BACKGROUND OF THE INVENTION

1. Field of the Invention

The present invention relates to a mobile communication terminal (also called a hand-held phone) with a multi-input unit and method of using the same. More particularly, the present invention relates to a multi-input unit capable of performing entry and search functions and method of using the same.

2. Description of the Related Art

Typically, a user enters desired text data using a key entry unit on their mobile terminal when entering desired text data. When searching for a desired menu of the mobile terminal, the user searches for a corresponding menu using arrow keys installed in the mobile terminal. In this manner, a variety of keys necessary for corresponding functions have been installed in the mobile terminal, such that the size of a display of the mobile terminal has become smaller. Also, following the current trend of rapidly increasing the number of multimedia services provided, the user has some difficulty in enjoying fast and convenient multimedia services using their mobile terminal with the conventional key entry unit.

SUMMARY OF THE INVENTION

Therefore, the present invention has been made in view of the above problems, and it is an object of the present invention to provide a multi-entry unit capable of performing entry and search functions using a mobile terminal and a method of using the same.

In accordance with one aspect of the present invention, the above and other objects can be accomplished by the provision of a mobile terminal for performing an entry function and a search function using a multi-entry unit. The multi-entry unit includes a light-emitting sheet having a variety of colors, and being illuminated with designated colors according to character categories during a touch-entry mode for a key entry function; a sense pad for detecting a key entry signal during the touch-entry mode, and detecting a selection signal generated by rotation during the wheel mode; a transparent ground sheet for separating the sense pad from the light-emitting sheet; and an injection material in which characters displayed during the touch-entry mode are differently formed according to their categories, and the characters are illuminated with their unique colors through the light-emitting sheet so that desired characters are displayed.

In accordance with another aspect of the present invention, there is provided a method for performing an entry function and a search function using a multi-entry unit for use in a mobile terminal. The method comprises determining whether a predetermined time elapses when a first input signal is detected; switching a current mode to a touch-entry mode for detecting a key entry signal, when a second input signal is detected before the predetermined time elapses; and switching a current mode to a wheel entry mode for detecting a selection signal generated by rotation when the second input signal is not detected after the lapse of the predetermined time.

In accordance with yet another aspect of the present invention, there is provided a method for performing an entry function and a search function using a multi-entry unit for use in a mobile terminal. The method comprises a) switching a current mode of the multi-entry unit to the touch-entry mode during a standby mode and an entry mode, and displaying character data in the touch-entry mode; and b) switching a current mode of the multi-entry unit to a wheel mode during a search mode.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
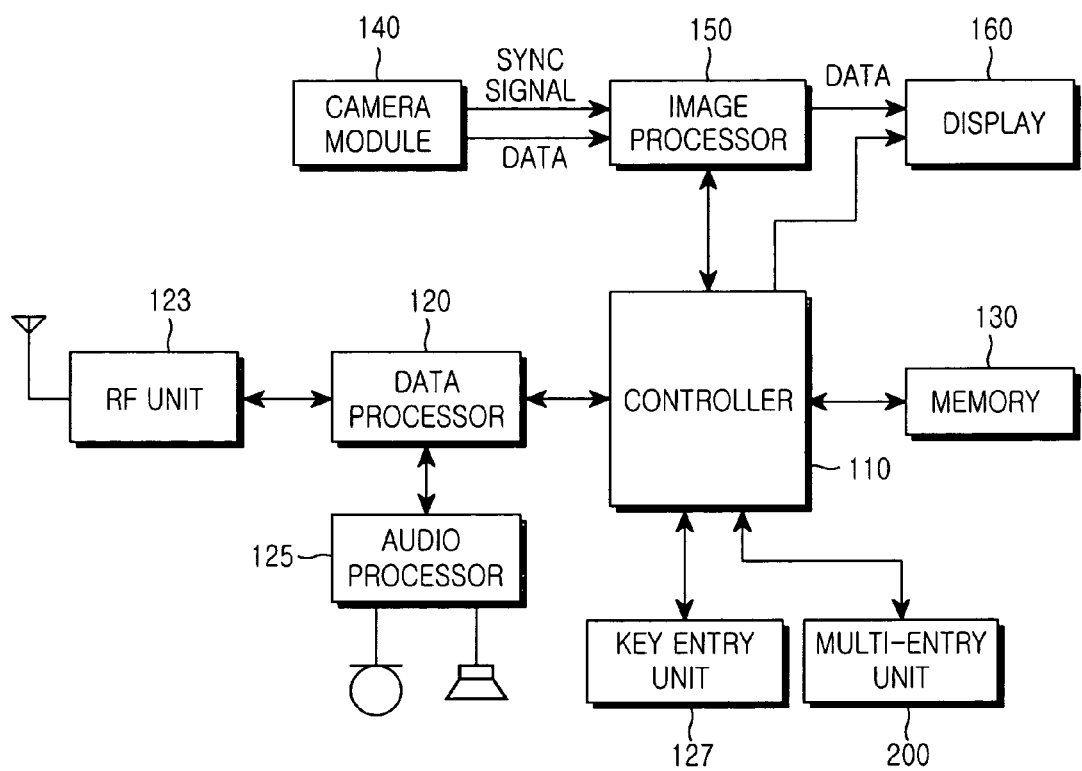
FIG. 1 is a block diagram illustrating a mobile terminal in accordance with an embodiment of the present invention.

Embodiments of the present invention will now be described in detail with reference to the accompanying drawings. In the drawings, the same or similar elements are denoted by the same reference numerals even though they are depicted in different drawings. In the following description, a detailed description of known functions and configurations incorporated herein will be omitted for conciseness.

Prior to describing the embodiments of the present invention, it should be noted that character data of the present invention includes the Korean alphabet (i.e., Hangul), the English alphabet including capital and lowercase letters, and special characters.

Figure 2:
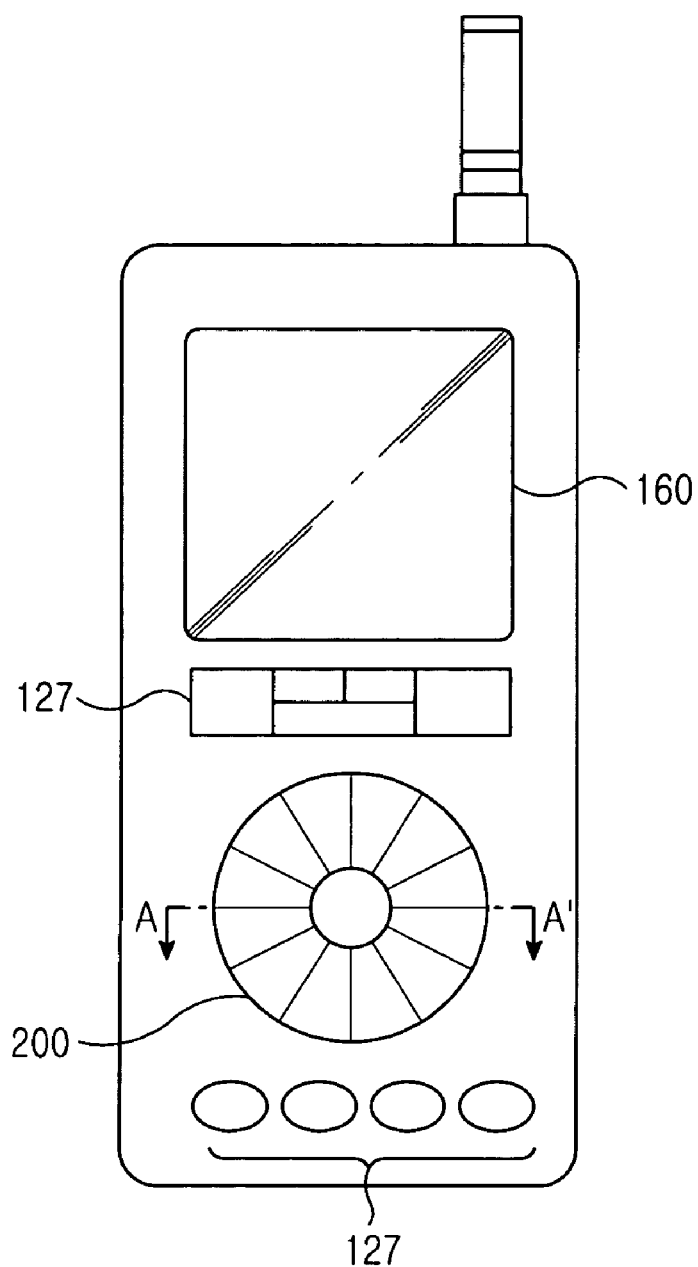
FIG. 2 shows the appearance of the mobile terminal in accordance with an embodiment of the present invention.

FIG. 1 is a block diagram illustrating a mobile terminal in accordance with an embodiment of the present invention. FIG. 2 shows the appearance of the mobile terminal in accordance with an embodiment of the present invention.

Referring to FIGS. 1 and 2, the Radio Frequency (RF) unit 123 performs a wireless communication function of the mobile terminal. The RF unit 123 includes an RF transmitter (not shown) for increasing/amplifying a frequency of a transmission signal; and an RF receiver (not shown) for low-noise-amplifying a received signal, and lowering a frequency of the received signal, etc. The data processor 120 includes a transmitter (not shown) for encoding/modulating the transmission signal; and a receiver for demodulating/decoding the received signal, etc. The data processor 120 may comprise a MODEM or a CODEC. In this case, the CODEC includes a data CODEC for processing packet data, etc., and an audio CODEC for processing audio signals such as voice signals, etc. The audio processor 125 reproduces an audio signal generated from the audio CODEC of the data processor 120, or transmits a transmission audio signal generated from a microphone to the audio CODEC of the data processor 120.

The memory 130 may comprise a program memory and at least one data memory. The program memory stores programs for controlling general operations of the mobile terminal and programs for controlling the multi-entry unit according to an embodiment of the present invention. The data memory temporarily stores data generated when the above programs are executed.

The controller 110 controls overall operations of the mobile terminal. The controller 110 may include the data processor 120. The controller 110 switches a standby mode or entry mode of the multi-entry unit to a touch-entry mode, such that it can perform key entry operations. During the standby mode, the controller 110 allows only number data among various character data to be displayed, and the number data is displayed by illumination of a corresponding color. The controller 110 allows the character data to be displayed during the entry mode. In this case, individual characters are set to different colors according to their categories, so that they are illuminated in different colors. The controller 110 switches a search mode of the multi-entry unit 200 to a wheel mode in accordance with an embodiment of the present invention, and performs a menu selection process using the rotational motion, such that it can perform the search process.

The camera module 140 includes a camera sensor for capturing image data, and converting the captured optical signal into an electrical signal; and a signal processor for converting an analog image signal captured by the camera sensor into digital data. In this case, it is assumed that the camera module is indicative of a Charge Coupled Device (CCD) sensor and the signal processor is implemented with a Digital Signal Processor (DSP). The camera sensor and the signal processor may be integrated in one unit, and may also be implemented separately from each other.

The image processor 150 generates screen data for displaying an image signal generated from the camera module 140. The image processor 150 processes the image signal generated from the camera module 140 in frame units, and outputs the frame data according to size and characteristic information of the display 160. The image processor 150 includes a video CODEC, compresses frame image data displayed on the display 160 using a predetermined scheme, and recovers original frame image data from the compressed frame image data. In this case, the video CODEC may be determined to be a Joint Picture Experts Group (JPEG) CODEC, a Moving Picture Experts Group 4 (MPEG4) CODEC, and a Wavelet CODEC, etc. It is assumed that the image processor 150 includes an On Screen Display (OSD) function. The image processor 150 may output OSD data according to screen sizes upon receiving a control signal from the controller 110.

The display 160 displays the image signal generated from the image processor 150 on the screen, and displays user data generated from the controller 110. In this case, the display 160 may be implemented with a Liquid Crystal Display (LCD). The display 160 may include an LCD controller, a memory for storing image data, and an LCD display, etc. If the LCD is implemented with a touch-screen LCD, it may function as an entry unit.

The key entry unit 127 includes a plurality of function keys for establishing a variety of functions. There are a variety of buttons in the function keys, for example, a Call button, a Cancel button, a Menu button, and a hot key button, etc. The key entry unit 127 may include a mode conversion key for controlling the multi-entry unit 200 to be switched to a touch-entry mode and a wheel entry mode according to an embodiment of the present invention. The key entry unit 127 may include a Hold key. The hold key holds a wheel function caused by a malfunction when the multi-entry unit 200 enters the touch-entry mode for implementing the key input function, and holds a touch-entry function caused by a malfunction during the wheel mode for implementing the search function in accordance with an embodiment of the present invention.

Figure 3:
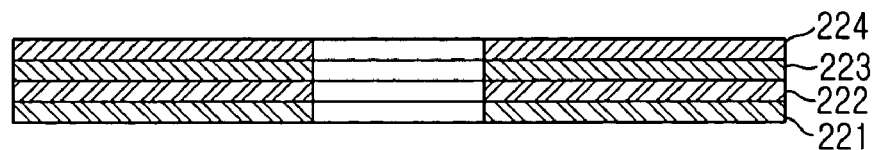
FIG. 3 is a cross-sectional view illustrating a multi-entry unit of FIG. 2 in accordance with an embodiment of the present invention.

The multi-entry unit 200 includes a plurality of touch-entry keys for entering text data and a wheel function for searching for a desired menu in accordance with an embodiment of the present invention. Reference numeral 201 (see FIG. 4A) contained in the multi-entry unit 200 may function as a confirmation key, or may also function as a function key capable of displaying text data according to categories of the text data during the touch-entry mode. Reference numeral 201 may be implemented with a jog shuttle. FIGS. 4A-4E show the appearances of the multi-entry unit 200 of FIG. 2 in accordance with an embodiment of the present invention. The multi-entry unit 200 will hereinafter be described with reference to FIGS. 4A-4E. The multi-entry unit 200 includes a light-emitting sheet 221 (see FIG. 3) illuminated in different colors; a sense pad 222 for detecting a key entry signal during the touch-entry mode, and detecting the horizontal rotation during the wheel mode; a transparent ground sheet 223 inserted between the light-emitting sheet 221 and the sense pad 222 so as to separate the sense pad 222 from the light-emitting sheet 221; and an injection material 224 where characters displayed during the touch-entry mode are included, and categories of the characters are illuminated in different colors through the use of the light-emitting sheet 221 in such a manner that a desired character is displayed.

The light-emitting sheet 221 made of an electric light-emitting sheet includes a variety of colors. If the multi-entry unit 200 is switched to the touch-entry mode, the light-emitting sheet 221 illuminates in different colors according to individual character categories, respectively, upon receiving a control signal of the controller 110. If the sense pad 222 is touched with a user's finger or pen during the touch-entry mode, it detects a position variation according to its current variation, and transmits a key value of the detected position to the controller 110. When the sense pad 222 is horizontally rotated in a circular shape of the multi-entry unit 200 due to the motion of the user's finger or pen during the wheel entry mode for detecting the rotation, it detects a direction vector value in response to a current variation caused by the motion of the user's finger or pen, and transmits the detected direction vector value to the controller 110. Different characters according to their categories are positioned at their designated positions in the injection material 224. Individual characters are set to different colors according to their categories. When the multi-entry unit 200 is switched to the touch-entry mode, the characters included in the injection material 224 are associated with their designated colors among a plurality of colors emitted from the light-emitting sheet 221 upon receiving a control signal from the controller 110, so that they are illuminated in different colors. For example, the Korean alphabet (i.e., Hangul) is illuminated with a red color, the English capital letters are illuminated with a yellow color, the English lowercase letters are illuminated with a blue color, number data is illuminated a green color, and special characters are illuminated with a purple color. If the light-emitting sheet 221 is illuminated with the above colors upon receiving a control signal from the controller 110, individual categories of the above characters are associated with their designated colors such that they are displayed in different colors. For example, in the case of displaying only the Hangul among the above character categories, the light-emitting sheet 221 is illuminated with a red color upon receiving a control signal from the controller 110. The Hangul included in the injection material 224 is associated with the red color so that the multi-entry unit 200 displays only red-colored Hangul data. In this case, a guide line for classifying the above characters may also be illuminated with a designated color in some cases. Individual colors corresponding to different categories of the above characters may be determined by a user.

Figure 4A:
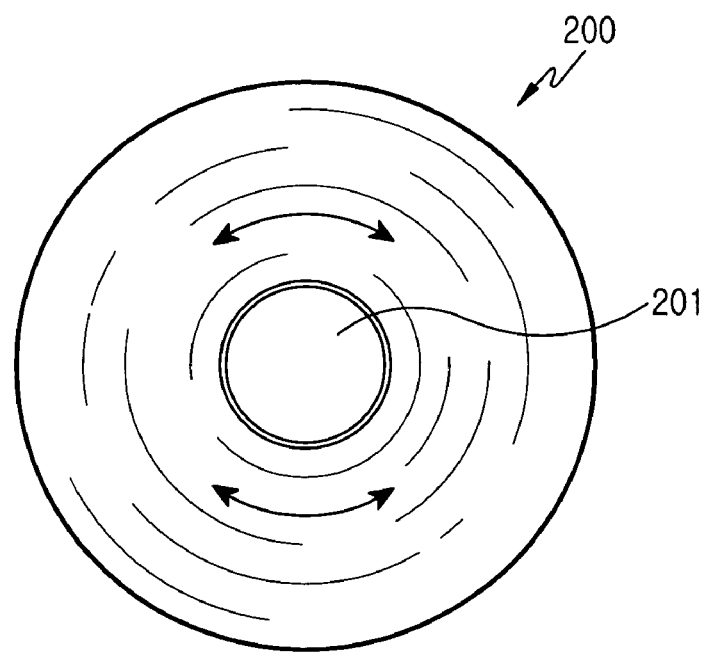
FIGS. 4a through 4e are the appearances of the multi-entry unit of FIG. 2 in accordance with an embodiment of the present invention.

FIG. 4A depicts a specific state in which the multi-entry unit 200 is switched to the wheel entry mode so that the search function can be carried out by the wheel rotation. FIGS. 4B-4E depict specific states in which the multi-entry unit 200 is switched to the touch-entry mode so that the key entry function can be carried out by a key input operation. The method for switching the mode of the multi-entry unit 200 to another mode as shown in FIGS. 4A-4E will hereinafter be described with reference to FIGS. 5 and 6.

Figure 5:
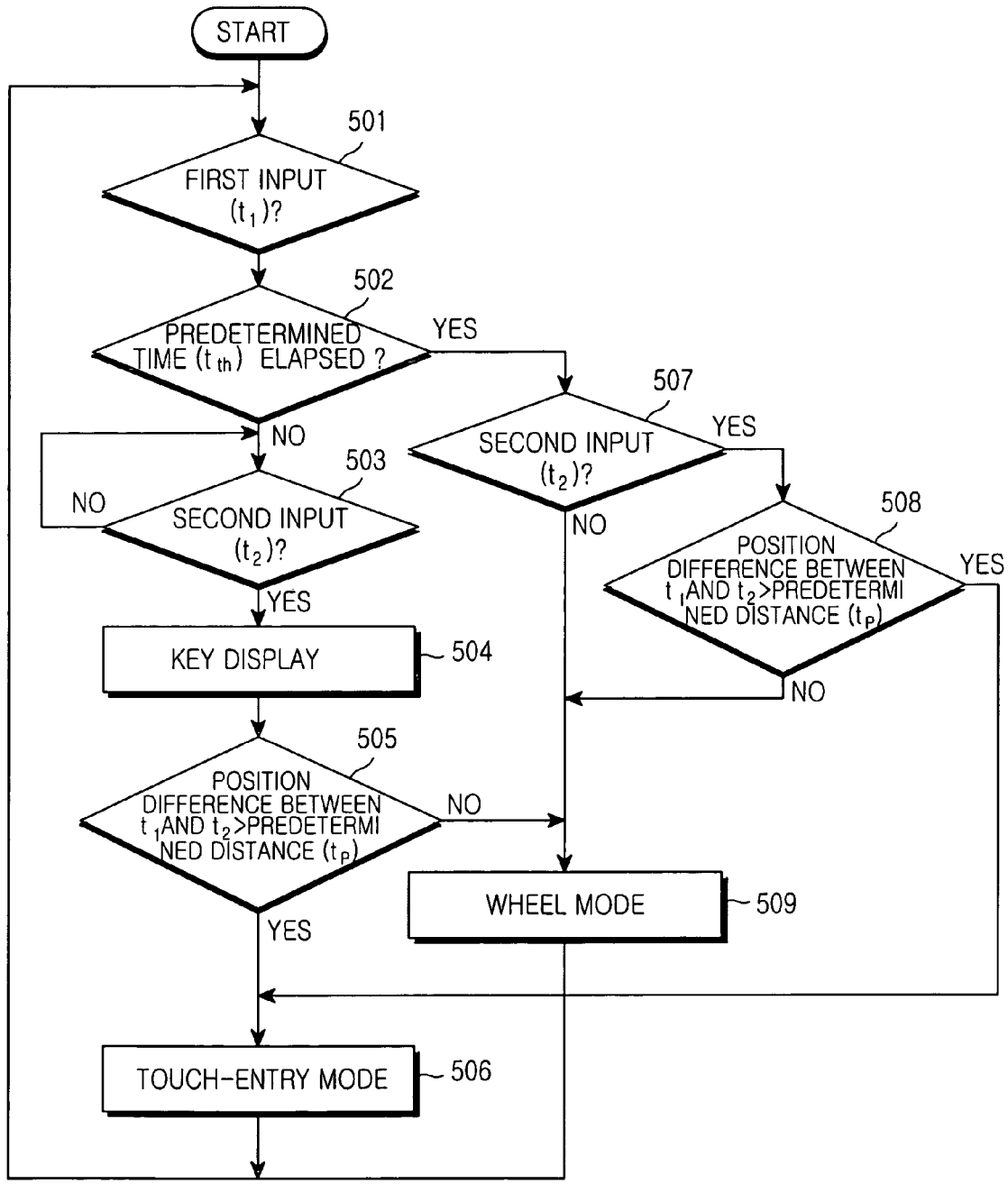
FIG. 5 is a flow chart illustrating a method for switching a current mode to a touch-entry mode or a wheel mode using the multi-entry unit of the mobile terminal in accordance with an embodiment of the present invention.

FIG. 5 is a flow chart illustrating a method for switching a current mode of the multi-entry unit of the mobile terminal to a touch-entry mode or a wheel mode in accordance with a preferred embodiment of the present invention. In accordance with a preferred embodiment of the present invention, during the touch-entry mode, the Korean alphabet (i.e., Hangul) is illuminated with a red color, the English capital letters are illuminated with a yellow color, the English lowercase letters are illuminated with a blue color, number data is illuminated with a green color, and special characters are illuminated with a purple color.

Referring to FIG. 5, if a first input signal $t_1$ occurs in the multi-entry unit 200, the controller 110 detects the first input signal $t_1$ at step 501, and determines whether a predetermined period of time elapses at step 502. If a second input signal $t_2$ occurs before the lapse of the predetermined period of time, the controller 110 detects the second input signal $t_2$ at step 503, and temporarily displays a character key on the multi-entry unit 200 as shown in FIG. 4C at step 504. The controller 110 calculates a difference between the first input signal $t_1$'s generation position and the second input signal $t_2$'s generation position, and determines whether the calculated difference is the same or higher than a predetermined distance $t_p$ at step 505. If it is determined that the calculated difference is the same or higher than a predetermined distance $t_p$ at step 505, the controller 110 switches a current mode to the touch-entry mode for the entry function at step 506. Otherwise, if it is determined that the calculated difference is less than the predetermined distance $t_p$ at step 505, the controller 110 switches a current mode to the wheel mode capable of performing a search function at step 509.

In more detail, if the first input signal $t_1$ is generated in the multi-entry unit 200 at step 501, the controller 110 determines whether the second input signal $t_2$ is not generated after the lapse of a predetermined period of time at step 507, and switches a current mode to the wheel mode capable of performing the search function at step 509.

If the first input signal $t_1$ is generated in the multi-entry unit 200 at step 501 and the second input signal $t_2$ is generated after the lapse of a predetermined period of time at step 507, the controller 110 detects the second input signal $t_2$, calculates a difference between the first input signal $t_1$'s generation position and the second input signal $t_2$'s generation position, and determines whether the calculated difference is less than a predetermined distance $t_p$ at step 508. If it is determined that the calculated difference is less than the predetermined distance $t_p$ at step 508, the controller 110 switches a current mode to the wheel mode for the search function at step 509. Otherwise, if it is determined that the calculated difference is the same or higher than the predetermined distance $t_p$ at step 508, the controller 110 switches a current mode to the touch-entry mode capable of performing the entry function at step 506.

Figure 4B:
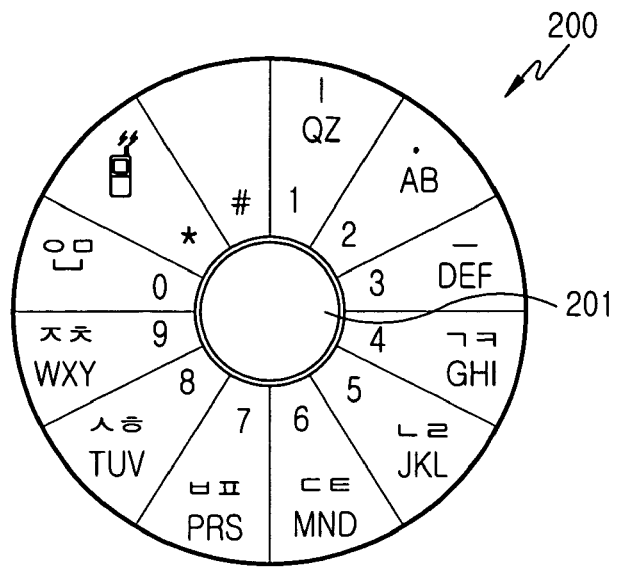
Figure 4C:
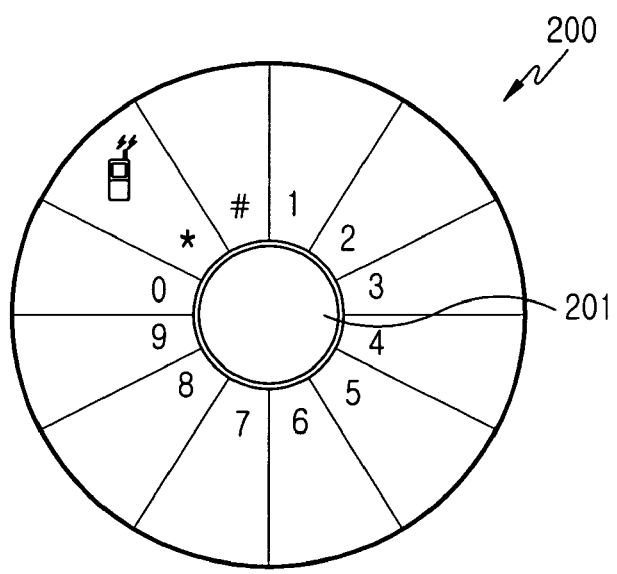
Figure 4D:
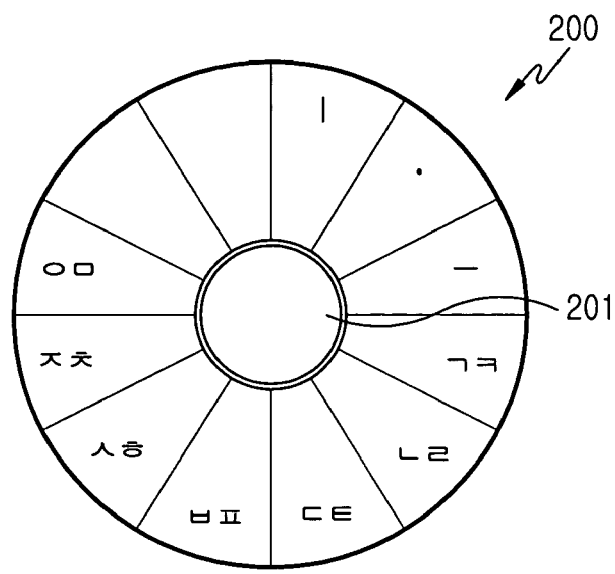
Figure 4E:
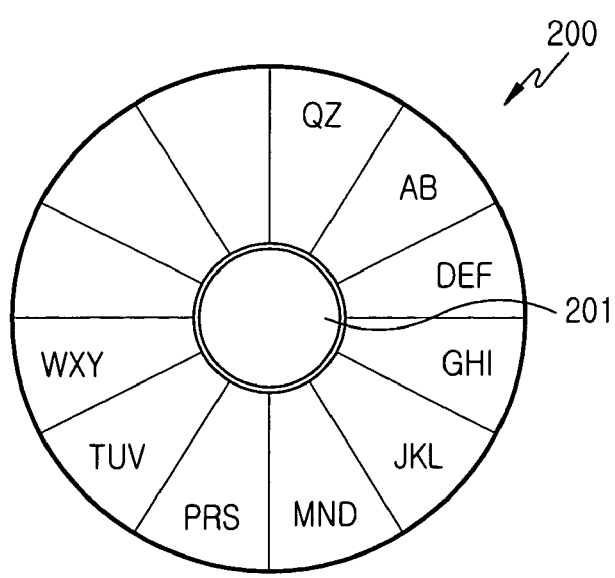

During the touch entry mode, individual characters are illuminated with their designated colors on the multi-entry unit 200 as shown in FIG. 4B, at step 506. During the touch entry mode, the user can write a desired sentence using the above characters, or can perform a communication function (also called a call function). When writing the above sentence, the user can allow the characters to be displayed one by one upon receiving an entry signal from the confirmation key 201 contained in the multi-entry unit 200. In this case, the displayed character is illuminated and displayed with its unique color. In more detail, whenever the entry signal is generated from the confirmation key 201, the multi-entry unit 200 can be switched in the form of FIG. 4B, FIG. 4C, FIG. 4D and FIG. 4E. In this manner, the user selects a desired character according to the entry signal of the confirmation key 201, and displays the selected character in such a way that a desired sentence can be configured. When the multi-entry unit 200 is switched to the touch-entry mode on the condition that the mobile terminal enters the standby mode, only number data illuminated with a green color can be displayed on the multi-entry unit 200, as shown in FIG. 4C. In order to prevent a malfunction from being generated while the entry function is performed in the touch-entry mode, the hold key of the key entry unit 127 is entered to prevent a current mode from being switched to the wheel mode.

During the wheel mode at step 509, the multi-entry unit 200 can be displayed in the form of FIG. 4A. In this case, the user can select a desired menu displayed on the display 160 by the horizontal rotation of the multi-entry unit 200, or can also adjust a volume and keytone in a call-connection state. Also, the user can adjust a music speed when listening to MP3 files using his or her mobile terminal, or can play the MP3 music files, such that the MP3 files can be controlled. In order to prevent a malfunction from being generated when the search function is performed in the wheel mode, the hold key of the key entry unit 127 is selected so that the wheel mode is not switched to the touch-entry mode.

Figure 6:
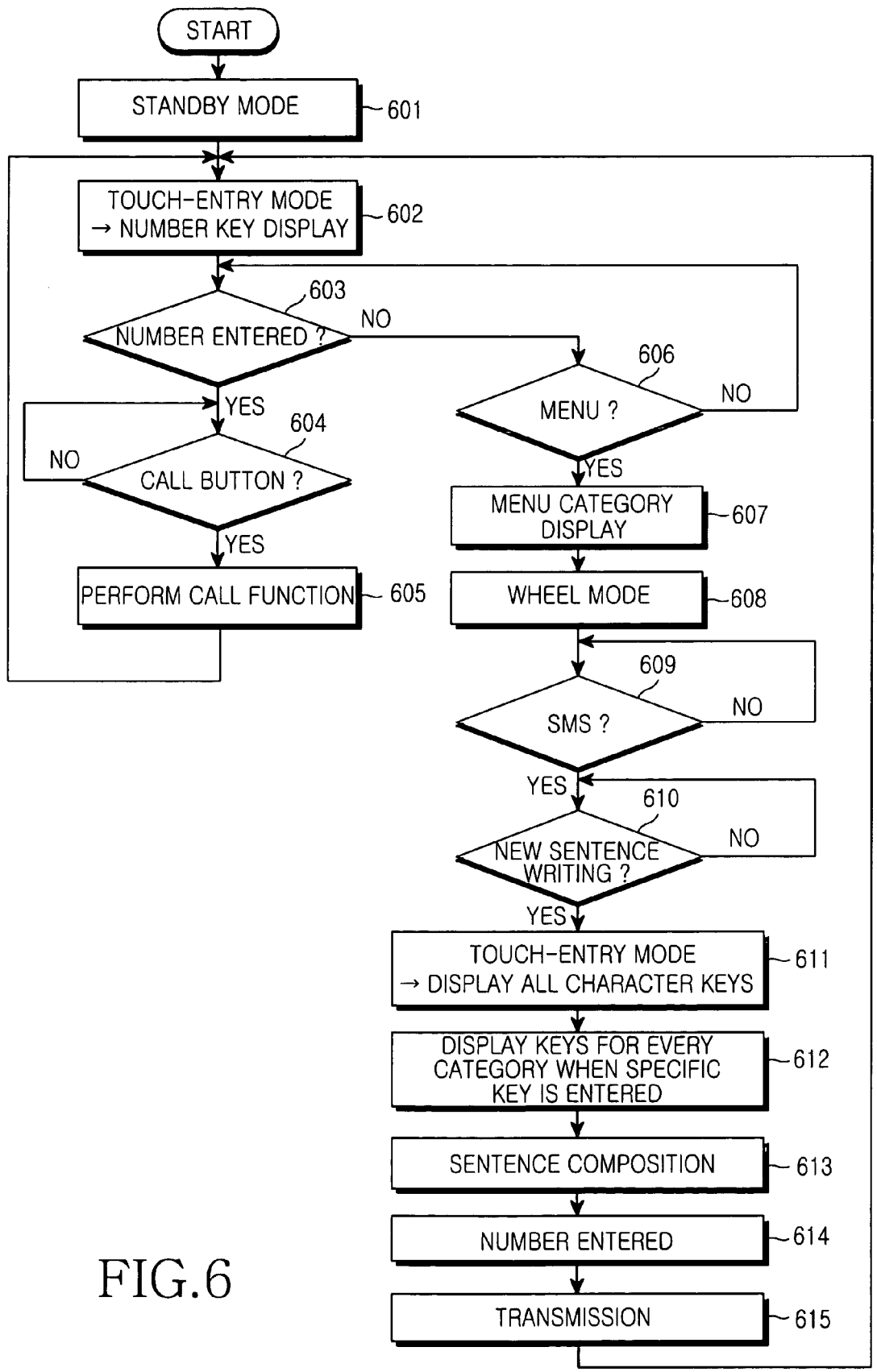
FIG. 6 is a flow chart illustrating a method for switching a current mode of the multi-entry unit of the mobile terminal to a touch-entry mode or a wheel mode in accordance with another embodiment of the present invention.

FIG. 6 is a flow chart illustrating a method for switching a current mode of the multi-entry unit of the mobile terminal to a touch-entry mode or a wheel mode in accordance with a second preferred embodiment of the present invention. In accordance with the second preferred embodiment of the present invention, during the touch-entry mode, the Korean alphabet (i.e., Hangul) is illuminated with a red color, the English capital letters are illuminated with a yellow color, the English lowercase letters are illuminated with a blue color, number data is illuminated a green color, and special characters are illuminated with a purple color.

The second preferred embodiment of the present invention will hereinafter be described with reference to FIGS. 1-4.

If the mobile terminal enters the standby mode, the controller 110 detects the standby mode of the mobile terminal at step 601, and switches the multi-entry unit 200 to the touch-entry mode at step 602. In this case, only the number data illuminated with the green color can be displayed on the multi-entry unit 200 as shown in FIG. 4C. If the user enters a corresponding number using the number data displayed on the multi-entry unit 200 and presses the Call button, the controller 110 detected the pressed Call button at step 604, and performs a call function (also called a communication function) at step 605. If the user presses a predetermined number button during at least a predetermined time at step 602, the controller 110 detects the pressed number button, and performs an abbreviated dialing function, so that it stores the pressed number as a storage number and establishes a call connection state using the stored number. In order to prevent a malfunction from being generated when the entry function is executed in the touch-entry mode, the hold button contained in the key entry unit 127 is entered so that the current mode is not switched to the wheel mode. The controller 110 can switch a current mode of the multi-entry unit 200 to the wheel mode using the mode conversion key contained in the key entry unit 127.

If the user presses a menu button contained in the key entry unit 127 at step 603, the controller 110 detects the pressed menu button at step 606, displays category information of the pressed menu button on the display 160 at step 607, and switches a current mode of the multi-entry unit 200 to the wheel mode as shown in FIG. 4A at step 608. In this case, in order to prevent a malfunction from being generated when the search function is executed in the wheel mode, the hold key contained in the key entry unit 127 is pressed so that the wheel mode is not switched to the touch-entry mode. The multi-entry unit 200 is switched to the touch-entry mode using the mode conversion key contained in the key entry unit 127. If the user selects a Short Message Service (SMS) from among a plurality of menus displayed on the display 160 by the rotation of the multi-entry unit 200 switched to the wheel mode, the controller 110 detects the selected SMS at step 609, and displays category information of the selected SMS. If the user selects a new sentence record menu from among the SMS categories using the multi-entry unit 200, the controller 110 detects the selected new sentence record menu at step 610, and switches the wheel mode of the multi-entry unit 200 to the touch-entry mode at step 611. In this case, individual characters on the multi-entry unit 200 are illuminated and displayed with their unique colors as shown in FIG. 4B. If the user presses the confirmation key 201 contained in the multi-entry unit 200, the controller 110 detects the pressed confirmation key 201, and displays the characters one by one whenever the confirmation key 201 is pressed at step 612. In this case, the displayed character is illuminated with its unique color. For example, if the order of the displayed character categories is determined to be "Number→Hangul→English alphabet (capital letters)", individual characters of the multi-entry unit 200 are illuminated with their unique colors in the order of FIG. 4B, FIG. 4C, FIG. 4D and FIG. 4E. In this manner, if the user selects a desired character category and finishes writing a desired sentence at step 613, the controller 110 detects the written sentence, and enters an outgoing call number at step 614. In this case, the multi-entry unit 200 is switched to the touch-entry mode upon receiving a control signal from the controller 110, so that the user can directly enter a desired outgoing call number. Otherwise, if the outgoing call number is searched for in the phone book, the multi-entry unit 200 may also be switched to the wheel mode.

If the phone number is completely entered at step 614, the controller 110 detects the entered phone number and transmits the SMS at step 615.

As apparent from the above description, the multi-entry unit of the mobile terminal according to the present invention is switched to the touch-entry mode or the wheel mode using the mode conversion key contained in the key entry unit. If the mode conversion key is entered when the multi-entry unit enters the touch-entry mode, the multi-entry unit can be switched to the wheel mode. In conclusion, the present invention includes the multi-entry unit in the mobile terminal, so that the search and entry functions can be quickly and conveniently carried out. The smaller the size of the key entry unit, the greater the size of the display, so that the multimedia environment is improved.

Although the embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mobile terminal for performing an entry function and a search function using a multi-entry unit, comprising:
   the multi-entry unit including:
      a light-emitting sheet having a variety of colors, and being illuminated with designated colors according to character categories during a touch-entry mode for a key entry function;
      a sense pad for detecting a key entry signal during the touch-entry mode, and detecting a selection signal generated by rotation during the wheel mode;
      a transparent ground sheet for separating the sense pad from the light-emitting sheet; and
      an injection material in which characters displayed during the touch-entry mode are differently formed according to their categories, and the characters are illuminated with their unique colors through the light-emitting sheet so that desired characters are displayed.

2. The apparatus according to claim 1, wherein number data is illuminated during the standby mode.

3. The apparatus according to claim 1, wherein character data is illuminated during the entry mode.

4. The apparatus according to claim 1, wherein the sense pad comprises a plurality of touch-entry keys for entering text data and a rotational member for navigating through a menu.

5. The apparatus according to claim 1, wherein the categories are based on at least one of language, upper case lettering and lower case lettering.

6. The apparatus according to claim 1, wherein the colors assigned to the categories are set by a user.

7. The apparatus according to claim 1, wherein the colors assigned to the categories are predetermined.

8. A method for performing an entry function and a search function using a multi-entry unit for use in a mobile terminal, the multi-entry unit comprising a plurality of touch-entry keys, the method comprising the steps of:
   a) determining whether a predetermined time elapses when a first input signal occurred in the multi-entry unit is detected;
   b) switching a current mode of the multi-entry unit to a touch-entry mode for detecting a key entry signal, when a second input signal occurred in the multi-entry unit is detected before the predetermined time elapses; and
   c) switching a current mode to a wheel entry mode for detecting a selection signal generated by rotation of the multi-entry unit when the second input signal is not detected after the lapse of the predetermined time.

9. The method according to claim 8, wherein the step (b) includes the steps of:
   displaying character data when the second input signal is detected before the predetermined time elapses;
   determining whether a difference between individual positions of the first and second input signals is the same or longer than a predetermined distance; and switching a current mode to the touch-entry mode when the difference is the same or longer than the predetermined distance.

10. The method according to claim 9, further comprising the step of:
switching a current mode to the wheel mode when the difference is less than the predetermined distance.

11. The method according to claim 8, wherein the step (c) includes the steps of:
determining whether a difference between individual positions of the first and second input signals is less than the predetermined distance, when the second input signal is detected after the lapse of the predetermined time; and
switching a current mode to the wheel mode when the difference between individual positions of the first and second input signals is less than the predetermined distance.

12. The method according to claim 11, further comprising the step of:
switching a current mode to the touch-entry mode when the difference between individual positions of the first and second input signals is the same or longer than the predetermined distance.

13. A method for performing an entry function and a search function using a multi-entry unit for use in a mobile terminal, the multi-entry unit comprising a plurality of touch-entry keys, the method comprising the steps of:
a) switching a current mode of the multi-entry unit to a touch-entry mode for detecting a key entry signal generated by the multi-entry unit, during a standby mode and an entry mode, and displaying character data in the touch-entry mode; and
b) switching a current mode of the multi-entry unit to a wheel mode for detecting a selection signal generated by rotation of the multi-entry unit, during a search mode.

14. The method according to claim 13, wherein the step for switching the multi-entry unit to the touch-entry mode during the standby mode includes the steps of:
displaying number data illuminated with its unique color on the multi-entry unit;
performing a call connection mode upon receipt of corresponding numbers; and
performing a hot key function when a corresponding number is pressed during at least a predetermined time.

15. The method according to claim 13, wherein the step for switching the multi-entry unit to the touch-entry mode during the entry mode includes the steps of:
displaying character data on the multi-entry unit in which the character data is illuminated and displayed with its unique color according to category information of the character data;
illuminating/displaying unique colors of the character data according to category information of the character data one by one, whenever a specific key is entered; and
entering a corresponding character when a category of the corresponding character selected by the entered specific key is displayed.

16. The method according to claim 13, wherein the touch-entry mode is switched to the wheel mode or the wheel mode is switched to the touch-entry mode, when a mode conversion key is pressed.

* * * * *